Jan. 27, 1925.
A. JONCHA
1,524,252
QUANTITY STOP DEVICE FOR LIQUID MEASURING AND DISPENSING PUMPS
Filed Jan. 9, 1924
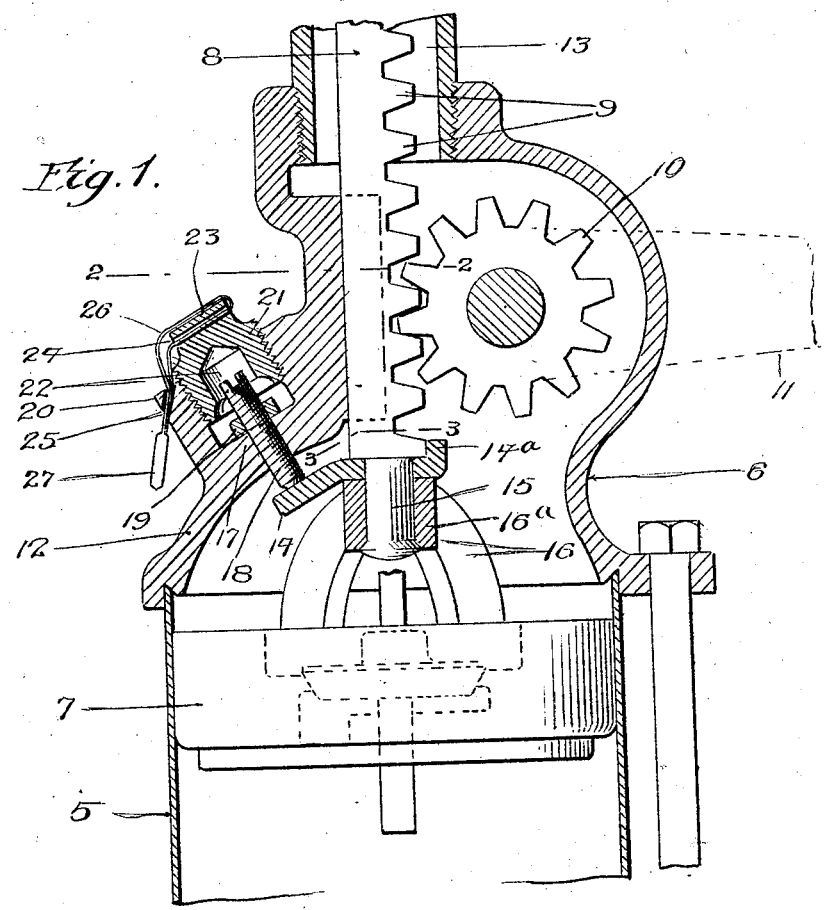
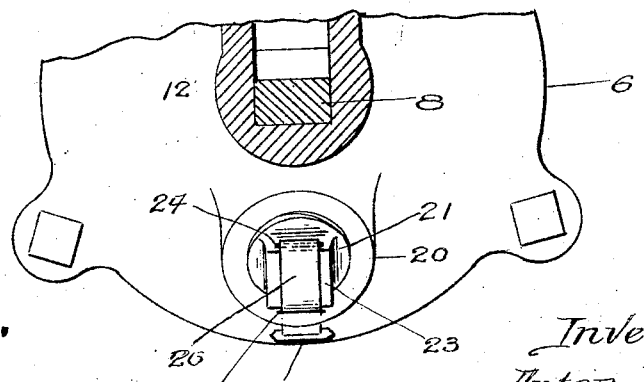
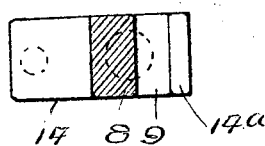
Inventor:
Anton Joncha,
by Charles O. Harvey
his Atty.

Patented Jan. 27, 1925.

1,524,252

UNITED STATES PATENT OFFICE.

ANTON JONCHA, OF MELROSE PARK, ILLINOIS, ASSIGNOR TO OIL PRODUCTS APPLIANCE CO., OF MAYWOOD, ILLINOIS, A CORPORATION OF ILLINOIS.

QUANTITY STOP DEVICE FOR LIQUID MEASURING AND DISPENSING PUMPS.

Application filed January 9, 1924. Serial No. 685,244.

*To all whom it may concern:*

Be it known that I, ANTON JONCHA, a citizen of the United States, and a resident of Melrose Park, Cook County, and State of Illinois, have invented certain new and useful Improvements in Quantity Stop Devices for Liquid Measuring and Dispensing Pumps, of which the following is declared to be a full, clear, and exact description.

This invention relates to quantity stop devices for liquid measuring and dispensing pumps, and its principal object is to provide a water-proof, sealed and adjustable stop device, of simple and novel construction. The invention consists in the several novel features hereinafter fully set forth and claimed.

The invention is clearly illustrated in the accompanying drawing, in which:—

Fig. 1 is a vertical, central section through a portion of the cylinder and head portion of a liquid measuring and dispensing pump, showing a simple embodiment of the invention applied thereto; Fig. 2 is a horizontal section taken on line 2—2 of Fig. 1, and Fig. 3 is a detail horizontal section taken on line 3—3 of Fig. 1.

Referring to said drawing, the reference character 5 designates the cylinder, 6 the cylinder head, 7 the plunger, 8 the plunger rod, which in this case has rack teeth 9 formed thereon, and 10 designates a spur pinion which meshes with said rack teeth and is driven by a hand crank 11. The head 6 has a hollow dome shaped portion 12, from which extends a discharge pipe 13, that leads to a nozzle (not shown) as is customary. The parts described, comprise the ordinary and well known plunger type measuring and dispensing pump for oil or other liquids. One full stroke of the plunger delivers a predetermined quantity of liquid, depending upon the bore of the cylinder and length of stroke of the plunger.

In order to positively arrest the up stroke of the plunger at the exact point, where a correct quantity of liquid is dispensed, and to provide for adjustments due to slight irregularities in construction, an adjustable stop device is provided, which will now be described.

Secured to the plunger rod is a laterally projecting lug 14, which as shown, comprises a piece of metal having an upturned end portion 14ª which engages a flat side of the plunger rod to prevent relative rotation between the plunger rod and lug. The lug is secured between the lower end of the plunger rod 8 and the plunger rod connection 16 by a reduced neck portion 15 of the rod, which extends through holes in the lug 14 and ring part 16ª of the plunger rod connection 16, the end of the neck portion 15 being headed or upset to clamp the lug between the lower end of the rod and the top of the ring part 16ª. Threadedly secured in the curved wall 12 of the dome like cylinder head 6 is an adjustable quantity stop screw 18 the lower end of which lies in the path of movement of the lug 14 and forms a stop or abutment against which said lug strikes and arrests the upward movement of the plunger. A lock nut 19 threaded upon the screw 18 bears against the wall 17 of the head and locks the screw in any place of adjustment.

Surrounding the upper end of the screw 18 is a hollow boss 20, which is formed upon the head 6, and threadedly secured upon said boss is a screw cap or plug 21 which forms a closure for the hollow boss and protects the screw. As shown the boss is internally threaded, and the plug is tapered and externally threaded and contains a recess 22 whereby the boss and plug may not protrude any considerable distance above the outer face of the cylinder head. A square or noncircular end portion 23 is provided on the plug for the reception of a wrench or other tool.

In the outer end portion of the plug 21 is formed a hole 24, and in the wall of the boss 20 is formed a hole 25, through which holes is passed a wire or metal strip 26 the ends of which are brought together in a soft metal or other seal 27, whereby unauthorized persons may not tamper with the adjustment screw and alter the length of up stroke of the plunger.

In the operation of the pump, the hand crank is turned until the lug 14 strikes against the screw 18. A predetermined quantity of liquid is thereby raised and discharged and an equal quantity taken into the cylinder below the plunger, the hand crank is then turned back and the plunger lowered to the bottom of its stroke, whereupon liquid in the cylinder below the plunger flows through the port in the plunger and enters the space above the plunger.

In case the pump is found to measure inaccurately, the proper person breaks the seal 27, unscrews the plug 21 and adjusts the screw 18 to bring its lower end at the precise place for arresting the plunger 7 at the point where it raises the correct quantity of liquid. He then screws the plug back and applies another seal thereto.

From the above it is evident that the adjustment screw is protected against rain, sleet and snow, that the head is leak proof at the place where the screw enters the head, and that the screw is sealed against tampering by unauthorized persons. The parts are few in number, and not likely to get out of order.

More or less variation of the exact details of construction is possible without departing from the spirit of this invention; I desire, therefore, not to limit myself to the exact form of the construction shown and described, but intend, in the following claims, to point out all of the invention disclosed herein.

I claim as new, and desire to secure by Letters Patent:

1. A quantity stop device for liquid measuring and dispensing pumps, comprising in combination with a pump cylinder, a cylinder head therefor, a plunger and plunger rod, of a quantity stop lug secured to said plunger, an externally accessible quantity stop screw threadedly secured in said cylinder head and locked against rotation, said screw extending into the path of movement of said lug, a hollow internally threaded boss formed upon said cylinder head and surrounding said screw, and a tapered, externally threaded recessed plug secured in said boss, and forming a waterproof closure for said stop screw, said plug and boss having holes therein for the reception of the wire of a metal seal.

2. A quantity stop device for liquid measuring and dispensing pumps, comprising in combination with a pump cylinder, a cylinder head therefor, a plunger having a plunger rod, rectangular in cross section, and having a reduced neck portion secured to the plunger, a quantity stop plate secured between the plunger and plunger rod and having a hole for the reduced neck, and an upturned end portion engaging the plunger rod to prevent relative rotation between the rod and quantity stop plate, of a quantity stop screw adjustably mounted in said head, and a leak proof enclosure for the outer end of said screw.

ANTON JONCHA.